United States Patent
Wurmfeld

(10) Patent No.: US 10,862,543 B2
(45) Date of Patent: Dec. 8, 2020

(54) APPARATUS AND METHOD FOR WIRELESS COMMUNICATION WITH IMPROVED RELIABILITY

(71) Applicant: Capital One Services, LLC, McLean, VA (US)

(72) Inventor: David Kelly Wurmfeld, Falls Church, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/250,356

(22) Filed: Jan. 17, 2019

(65) Prior Publication Data

US 2020/0235787 A1 Jul. 23, 2020

(51) Int. Cl.
*H04B 5/00* (2006.01)
*H02J 50/10* (2016.01)
*H04W 4/80* (2018.01)

(52) U.S. Cl.
CPC ............ *H04B 5/0087* (2013.01); *H02J 50/10* (2016.02); *H04B 5/0031* (2013.01); *H04B 5/0037* (2013.01); *H04W 4/80* (2018.02)

(58) Field of Classification Search
CPC .......................... H04B 5/00–5/02; H02J 50/10
See application file for complete search history.

(56) References Cited

U.S. PATENT DOCUMENTS

| | | | | |
|---|---|---|---|---|
| 4,499,606 A | * | 2/1985 | Rambo | H04B 7/0814 455/277.2 |
| 4,652,888 A | * | 3/1987 | Deasy | H01Q 9/38 343/791 |
| 6,078,797 A | * | 6/2000 | Kashimura | H03G 1/0088 455/234.1 |
| 6,628,732 B1 | * | 9/2003 | Takaki | H04W 52/225 370/342 |
| 7,205,896 B2 | * | 4/2007 | Wu | G08B 13/2471 340/572.1 |
| 7,211,986 B1 | * | 5/2007 | Flowerdew | H02J 50/12 320/108 |
| 9,014,681 B2 | | 4/2015 | Nakazawa et al. | |
| 9,050,235 B2 | * | 6/2015 | Blair | H01Q 5/00 |
| 9,152,832 B2 | | 10/2015 | Royston et al. | |
| 9,270,343 B2 | | 2/2016 | Van Lammeren et al. | |
| 9,276,554 B2 | | 3/2016 | Lynch et al. | |
| 9,306,626 B2 | | 4/2016 | Hall et al. | |

(Continued)

FOREIGN PATENT DOCUMENTS

JP 2007329983 A * 12/2007

OTHER PUBLICATIONS

Description JP2007329983—English translation of corresponding Japanese patent document (Year: 2019).*

(Continued)

*Primary Examiner* — Gennadiy Tsvey
(74) *Attorney, Agent, or Firm* — Hunton Andrews Kurth LLP

(57) ABSTRACT

An apparatus for facilitating wireless communication that includes a base having a reference plane; a plurality of coils disposed on the base, the coils having elevation angles other than zero with respect to the reference plane and being tuned to a near field communication frequency; an input/output terminal; and a switching device selectively coupling the coils to the input/output terminal.

17 Claims, 13 Drawing Sheets

(56) References Cited

U.S. PATENT DOCUMENTS

| | | | | |
|---|---|---|---|---|
| 9,312,924 | B2* | 4/2016 | Ozaki | H04B 5/0075 |
| 9,627,913 | B2 | 4/2017 | Maugars | |
| 10,050,470 | B1* | 8/2018 | Leabman | H02J 5/005 |
| 2002/0024441 | A1* | 2/2002 | Terashima | G08B 13/2474 |
| | | | | 340/572.7 |
| 2002/0036595 | A1* | 3/2002 | Chiang | H01Q 3/242 |
| | | | | 343/876 |
| 2005/0162331 | A1* | 7/2005 | Endo | H01Q 1/2216 |
| | | | | 343/788 |
| 2005/0170793 | A1* | 8/2005 | Nakagawa | G06K 7/0008 |
| | | | | 455/116 |
| 2006/0043178 | A1* | 3/2006 | Tethrake | G06K 19/07749 |
| | | | | 235/385 |
| 2008/0020707 | A1* | 1/2008 | Takayama | H04L 63/045 |
| | | | | 455/41.2 |
| 2008/0288958 | A1* | 11/2008 | Ryoo | G06F 9/54 |
| | | | | 719/313 |
| 2010/0079261 | A1* | 4/2010 | Goto | H04B 5/0075 |
| | | | | 340/10.51 |
| 2010/0079347 | A1* | 4/2010 | Hayes | H01Q 1/246 |
| | | | | 343/705 |
| 2011/0084657 | A1* | 4/2011 | Toya | H02J 7/0044 |
| | | | | 320/108 |
| 2011/0127953 | A1* | 6/2011 | Walley | G06K 7/10207 |
| | | | | 320/108 |
| 2011/0148593 | A1* | 6/2011 | Benedict | G06K 7/10346 |
| | | | | 340/10.3 |
| 2011/0306296 | A1* | 12/2011 | Takahashi | G06K 7/10336 |
| | | | | 455/41.1 |
| 2012/0086553 | A1* | 4/2012 | Wilkinson | G06K 19/07749 |
| | | | | 340/10.1 |
| 2012/0194386 | A1* | 8/2012 | Mussler | H01Q 1/28 |
| | | | | 342/374 |
| 2013/0005251 | A1* | 1/2013 | Soar | H02J 7/025 |
| | | | | 455/41.1 |
| 2013/0084801 | A1 | 4/2013 | Royston et al. | |
| 2013/0175877 | A1* | 7/2013 | Abe | H02J 50/12 |
| | | | | 307/104 |
| 2013/0273871 | A1* | 10/2013 | Kravets | H04B 1/1036 |
| | | | | 455/307 |
| 2015/0038079 | A1* | 2/2015 | Kwon | H01Q 3/24 |
| | | | | 455/41.1 |
| 2015/0045091 | A1* | 2/2015 | Nakatani | H04B 5/0037 |
| | | | | 455/556.1 |
| 2015/0118957 | A1* | 4/2015 | Schaefer | H04B 5/0081 |
| | | | | 455/41.1 |
| 2016/0111208 | A1* | 4/2016 | Park | H01F 27/006 |
| | | | | 307/104 |
| 2016/0118835 | A1* | 4/2016 | Desai | H02J 50/12 |
| | | | | 320/108 |
| 2016/0261137 | A1* | 9/2016 | Riehl | H02J 7/042 |
| 2016/0280149 | A1* | 9/2016 | Nakano | B60R 11/0235 |
| 2016/0285531 | A1* | 9/2016 | Li | H04B 7/0691 |
| 2017/0115511 | A1* | 4/2017 | Beaton | G02C 7/04 |
| 2018/0210077 | A1* | 7/2018 | Jones | G01S 13/86 |
| 2018/0250586 | A1 | 9/2018 | Bellingham et al. | |
| 2019/0065795 | A1* | 2/2019 | Valencia | G06K 7/10366 |

OTHER PUBLICATIONS

Prism (geometry), Wikipedia, located at https://en.wikipedia.org/wiki/Prism_(geometry) (Year: 2020).*

Moghimi, M. J., Fernandes, J., Kanhere, A., & Jiang, H. (2015). Micro-Fresnel-zone-plate array on flexible substrate for large field-of-view and focus scanning. Scientific reports, 5, 15861. (11 pages).

* cited by examiner

US 10,862,543 B2

APPARATUS AND METHOD FOR WIRELESS COMMUNICATION WITH IMPROVED RELIABILITY

TECHNICAL FIELD

The present disclosure relates generally to an apparatus and method for wireless communication between devices, and more particularly, to a method and apparatus for multidirectional near-field communication with improved reliability.

BACKGROUND

Wireless communication protocols are increasingly used in industrial, commercial, and consumer applications. For example, near-field communication (NFC) is a type of wireless communication that connects electronic devices when they are in close proximity, normally within about 10 cm. NFC involves an 'initiator' that generates a radio frequency (RF) field to power a passive 'target' via electromagnetic induction. Once the target is powered, the initiator is able to request information from the target and perform transactions.

NFC's short-range and ability to communicate with a passive target make NFC advantageous for certain applications. For example, NFC can be used when it is desirable to communicate wirelessly with small unpowered devices. Because the initiator may provide power to the target, NFC targets can have very simple forms, such as unpowered tags, stickers, key fobs, or cards. Moreover, NFC can be used to exchange sensitive and personal information, such as credit or debit card information, because NFC's short range reduces susceptibility to man-in-the-middle or similar spoofing attacks. Therefore, NFC may not require authentication steps and may employ only simple hardware, thus providing quick and easy wireless communication. These advantages make NFC a good candidate for contactless applications, such as contactless payment and contactless identification.

While NFC has important advantages, it also has drawbacks that have discouraged user adoption. NFC users complain that NFC is unreliable, reporting that NFC communications are frequently unsuccessful or too slow. For example, NFC users report they must wait several seconds before an NFC connection between the initiator terminal and their target devices is established. Also, NFC users report that they have to reposition their devices multiple times before an NFC connection is successful, making a transaction that is normally fast unnecessarily cumbersome. In addition, NFC users report that many times after establishing connection, the NFC communication is nonetheless unsuccessful and they must restart the communication process. These reliability issues frustrate users of contactless payment and contactless identification methods, who may then return to traditional non-NFC identification or payment methods to avoid these issues.

Underlying many of NFC's reliability issues are NFC's requirements of close proximity and tight alignment between the initiator and the target. To have successful and reliable communication, NFC requires that the initiator and the target be within a few centimeters and be precisely aligned. Specifically, NFC coils of the initiator and target should be close and parallel to each other. Without such proper alignment, communication may be unsuccessful due to low signal strength or interference from noise sources. Indeed, poor alignment between the initiator and target can be catastrophic for the communication because small position or orientation differences can reduce the intensity of RF signals by orders of magnitude.

The disclosed apparatus and method for wireless communication address one or more of the problems set forth above and/or other problems in the prior art.

SUMMARY

One aspect of the present disclosure is directed to an apparatus for facilitating wireless communication. Another aspect of the present disclosure is directed to an automated teller machine. Yet another aspect of the present disclosure is directed to a method for communicating with an NFC device.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The disclosure is generally directed to a system including a communication array employing multiple NFC coils having different orientations to improve the reliability of NFC communications. The orientations can be achieved by arranging the coils with different elevation angles with respect to a base plane. Then, the coils will direct RF field in different directions, and cover multiple potential target locations and multiple potential device orientations. Further, the coils may be coupled to a controller and a switching device that can select and use the coil with a strongest link. With this arrangement, the disclosed communication array can minimize required repositioning of a target device when attempting to establish NFC communication, because the communication array can identify a strong link without forcing a user to reposition the target. For example, using traditional NFC coils a user must move the target device until the device is in close proximity and aligned with the initiator's NFC coil. In contrast, with the disclosed apparatus and methods, the initiator will select a coil configuration to match a user initial orientation. Moreover, the communication array may include coils of different shapes and different sizes, providing a wider variety of options from which to select the best link.

Furthermore, the communication array may be operated using a scanning method to assess the link between a selected coil and the target. In the scanning method, a switch may sequentially query coils in the communication array and gather feedback signals to identify the best link. The scanning method may be directed by a controller that measures feedback signals and has the ability to interrupt the process once it finds the strongest link. The scanning process may provide the ability to quickly identify the coil with best coupling, by sequentially connecting coils with the communication module. Once a coil with the best coupling is identified, the controller may configure the communication array so that an NFC link is established using the identified coil. In addition, in some embodiments the scanning method may identify multiple coils in the communication array that may be used simultaneously to improve the communication. The scanning method in conjunction with the communication array may improve the opportunity for reception of the NFC signals and may enhance the reliability of NFC communications.

Reference will now be made in detail to the disclosed embodiments, examples of which are illustrated in the accompanying drawings.

Figure 1:
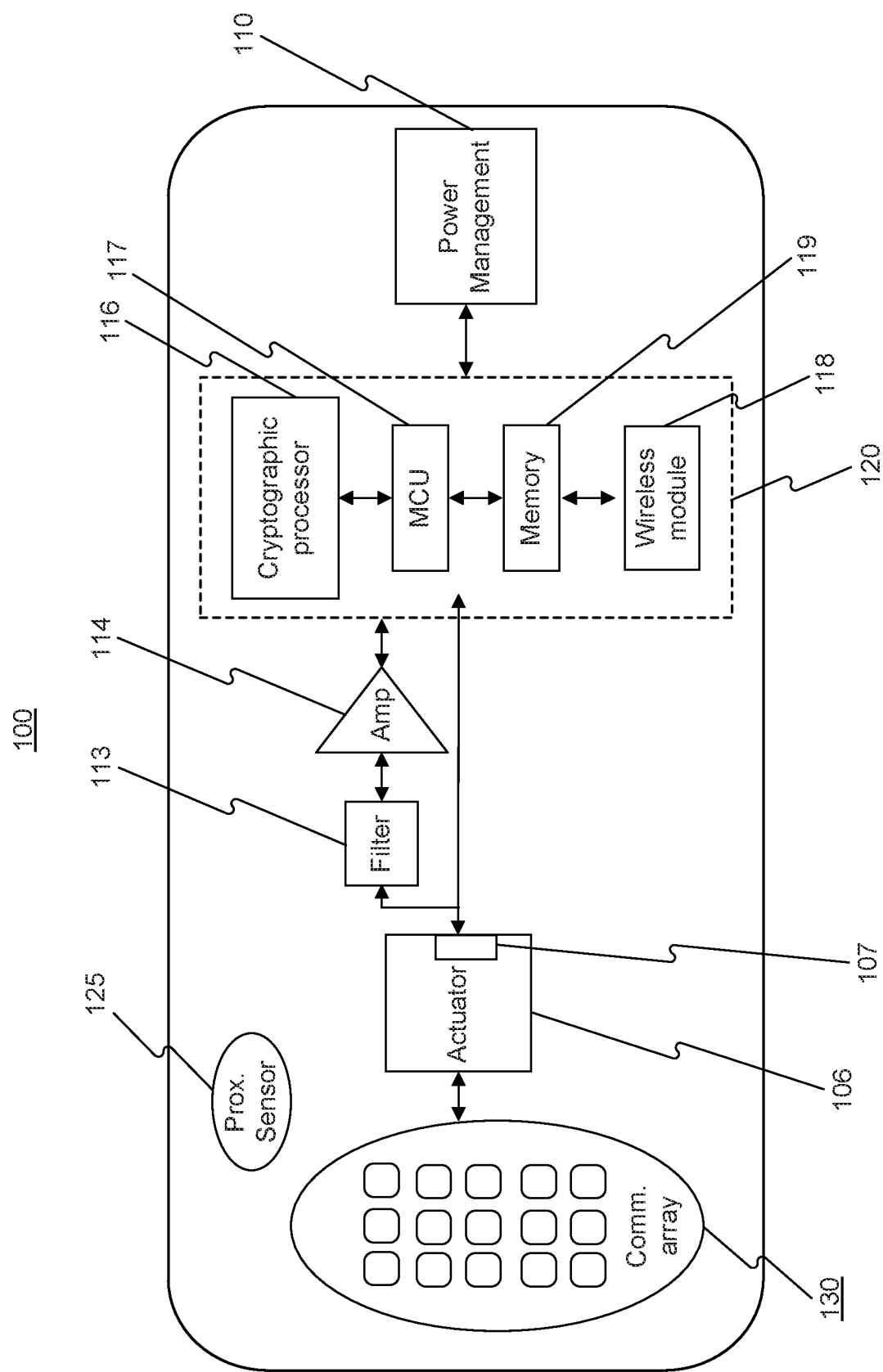
FIG. 1 is a block diagram of an exemplary wireless communication system consistent with disclosed embodiments.

FIG. 1 is a block diagram of an exemplary wireless communication system 100 consistent with disclosed embodiments. In some embodiments, wireless communication system 100 may be configured as a wireless subsystem that provides wireless communication capabilities. For example, wireless communication system 100 may be part of an automated teller machine (ATM) and may provide the ATM with wireless communication capabilities. Similarly, wireless communication system 100 may be part of a payment terminal and enable wireless communication between the payment terminal and wireless devices, such as smartphones. In such embodiments, wireless communication system 100 may be coupled to, and controlled by, central processing units programmed to operate the ATM or the payment terminal device.

Wireless communication system 100 may include a controller 120 coupled to a power management 110, and a communication array 130, via an actuator 106. Controller 120 may include a cryptographic processor 116, a microcontroller unit 117, a wireless communication module 118, and a memory unit 119. In addition, wireless communication system 100 may include a filter 113, an amplifier 114, and a proximity sensor 125. Elements in wireless communication system 100 may be electrically coupled as indicated by arrows in FIG. 1. For example, actuator 106 may be connected to controller 120 via filter 113 and amplified 114. However, connections other than those presented in FIG. 1 are possible. For example, instead of being connected directly to power management 110, controller 120 may be connected to power management 110 through filter 113.

Communication array 130 may include a plurality of coils, and/or antennas to receive and transmit RF signals. In some embodiments, communication array 130 may be an initiator of NFC communication. In such embodiments, communication array 130 may be configured to generate RF signals that induce an NFC target and then receive RF signals. For example, communication array 130 may include a plurality of loop coils or antennas with an electronic switch (or capacitive sensor) in series. Communication array 130 may also be employed in wireless communication systems other than NFC. Additionally, communication array 130 may include modules for other RFID standards specifying proprietary data formats in a closed-loop system. However, communication array may also be configured to use different frequencies that allow for longer ranges. For example, communication array 130 may include a module to perform RFID Radio frequency identification (RAIN). In yet other embodiments, communication array 130 may include modules for BLE—Bluetooth Low-Energy, or Beacons. In such embodiments, communication array 130 may use standard wireless protocols used in many portable devices to allow greater range than NFC. In yet other embodiments, communication array 130 may include WiFi, ZigBee, Z-Wave and/or LiFi, Ultrasonic, or Chirpcast modules. Components and configuration of communication array 130 are further described in connection to FIGS. 2-5.

Actuator 106 may be implemented as a switching device with multiple connection positions. For example, actuator 106 may be implemented as an electrical and/or electromechanical relay switch. In other embodiments actuator 106 may be implemented with solid state circuitry. For example, actuator 106 may include a de-multiplexor or a programmable logic devices (PLD) multiplexer that selects one of multiple signals to transmit. In yet other embodiments, actuator 106 may be implemented with arrangements of PMOS or NMOS transistors, as well as other types of solid state switches (such as BJT transistors or a controlled avalanche diodes) configured to connect antennas and/or coils of communication array 130. In alternative embodiments, actuator 106 may be implemented as a non-solid state switch, such as a magnetic switch or miniature vacuum relay.

In some embodiments, actuator 106 may include an actuator input 107 that controls the status of actuator 106. In such embodiments, actuator 106 may be connected to controller 120, which may transmit instructions to actuator 106 to connect one or more coils of communication array 130. For example, if actuator 106 is implemented with an electromechanical relay assembly, controller 120 may apply control signals to modify the configuration of actuator 106 and connect one or more of the coils in communication array 130. Alternatively, actuator 106 may be implemented with electronic switching devices or multiplexers to achieve the desired connections to communication array 130.

To facilitate data processing during NFC exchanges, signals from actuator 106 may be filtered with filter 113 and amplified with amplifier 114. Filter 113 may include analog or digital circuitry to perform low-pass or band-pass filtering operations. For example, to remove noise from the wireless device circuitry, signals from communication array 130 and actuator 106 may be filtered to eliminate low-frequency signals that are not used in the wireless communication. In such embodiments, filter 113 may be a resistance-capacitance RC filter configured to have a low cutoff frequency determined by 1/RC. Alternatively, filter 113 may include a resistance-inductance (RL) filter, a second-order filter, or a high-order filter with a combination of electronic components. However, in other embodiments, filter 113 may include a digital filter which first digitizes the signals from communication array 130 and then filters then using a data processing technique such a Fast Fourier Transform (FFT). For example, filter 113 may include an analog-to-digital converter coupled with at least one of Bessel filters, Butterworth filters, or Savitzky-Golay filters, among other configurable digital filters.

Amplifier 114 may include digital or analog amplifiers. For example, amplifier 114 may include operational amplifiers configured with a controlled feedback through an external circuit that is coupled to controller 120. In such embodiments, amplifier 114 may include an integrated amplifier circuit and/or discrete transistor circuits. In other embodiments, amplifier 114 may include a fully differential amplifier constructed using BJTs or FETs. Alternatively, or additionally, amplifier 114 may include one or more stages having summed outputs. In such embodiments, the gain of each stage may add linearly to the output rather than multiplies one on the other as in a cascade configuration. This embodiments may be preferred when a higher bandwidth to be achieved than could otherwise be realized even with the same gain stage elements.

In other embodiments, amplifier 114 may be implemented with digital circuitry. For example, amplifier 114 may be a digital circuit that receives a digital input from actuator 106 or communication and converts the signal to a Pulse Width Modulation (PWM) format. In such embodiments, amplifier 114 may produce a high voltage signal which replicating the original signal from actuator 106 or communication array 130.

In some embodiments, controller 120 may be a single device comprising multiple components such as cryptographic processor 116, a microcontroller unit (MCU 117), wireless module 118, and memory unit 119. However, in other embodiments, controller 120 may be a collection of individual devices. For example, controller 120 may group individual connected units of wireless communication system 100.

Cryptographic processor 116 may include a secure cryptoprocessor chip or a microprocessor dedicated to carrying out cryptographic operations, embedded in a packaging with multiple physical security measures. Such measures may give cryptographic processor 116 a degree of tamper resistance. In some embodiments, cryptographic processor 116 may be configured to host contactless applets and output decrypted data onto a bus in a secure environment. Cryptographic processor 116 may not output decrypted data or decrypted program instructions in an environment where security cannot always be maintained.

In some embodiments, cryptographic processor 116 may be configured to perform operations comprising tamper-detecting and tamper-evident containment. In such embodiments cryptographic processor 116 may include conductive shield layers in the chip that prevent reading of internal signals, controlled execution to prevent timing delays from revealing any secret information, and/or automatic zeroization of stored data in the event of tampering. Moreover, cryptographic processor 116 may be configured with chain-of-trust boot loader and/or a chain-of-trust operating system which authenticates an operating system before loading it. Cryptographic processor 116 may also include hardware-based capability registers, implementing a one-way privilege separation model.

In other embodiments, cryptographic processor 116 may be optimized for public key operations targeting network infrastructure across the enterprise and the data center. These operations may execute public key algorithms such as RSA, Diffie Hellman and Elliptic Curve Cryptography (ECC) forming the basis of digital signature and key exchange protocols to make secure transactions possible. By providing public key acceleration, the cryptographic processor 116 may enable networks to efficiently handle SSL and IPsec traffic that requires public key. However, cryptographic processor 116 may also accelerate bulk encryption.

MCU 117 may include a microcontroller or a system on a chip such as an Arduino. Alternatively, MCU 117 may include one or more known processing devices, such as microprocessors manufactured by Intel™ or AMD™ or licensed by ARM. MCU 117 may constitute a single core or multiple core processors that executes parallel processes simultaneously. For example, MCU 117 may be a single core processor configured with virtual processing technologies. In certain embodiments, MCU 117 may use logical processors to simultaneously execute and control multiple processes. In some embodiments, MCU 117 may implement virtual machine technologies, or other known technologies to provide the ability to execute, control, run, manipulate, store, etc. multiple software processes, applications, programs, etc. In another embodiment, MCU 117 may include a multiple-core processor arrangement (e.g., dual, quad core, etc.) configured to provide parallel processing functionalities to allow wireless communication system 100 to execute multiple processes simultaneously. For example, MCU 117 may be configured to process multiple input signals from communication array 130 simultaneously. Other types of processor arrangements could be implemented that provide for the capabilities disclosed herein.

Wireless module 118 may include a processor that generates and process near-field communication (NFC) signals to communicate with an NFC device such as a smart phone, a smart watch, or a credit card. For example, wireless module 118 may include a module that generates signals that may be transmitted by communication array 130 to power an NFC target and then transmit communication instructions. Wireless module 118 may also configured to process NFC signals received through coils of communication array 130. Wireless module 118 may be custom-encoded by the manufacturers or use NFC Forum specifications. Moreover, wireless module 118 may be configured to receive personal data such as debit and credit card information, loyalty program data, PINs and networking contacts, among other information. Wireless module 118 may include radio frequency circuitry to generate excitation and communication signals. In some embodiments, wireless module 118 may operate within the globally available and unlicensed radio frequency ISM band of 13.56 MHz used for NFC communications.

Memory unit 119 may include a volatile or non-volatile, magnetic, semiconductor, solid-state, tape, optical, removable, non-removable, or other type of storage device or tangible (i.e., non-transitory) computer-readable medium that stores one or more program and data. Data stored in memory unit 119 may include, for example, history of feedback signals received from communication array 130, selected coils, and identification information. In some embodiments, memory unit 119 may include one or more rule sets for prioritizing the selection of coils for NFC communications.

Power management 110 may include circuitry and processing units that monitor and control power sources that feed wireless communication system 100. Power management 110 may include one or more forms of electronic power conversion and/or relevant power control functions.

Proximity sensor 125 may include an electronic sensor with the ability to detect the presence of near objects or people without any need of physical contact. Proximity sensor 125 may emit an electromagnetic field or a beam of electromagnetic radiation (infrared, for instance), and look for changes in the field or a return signal. Proximity sensor 125 may be implemented with different sensor technologies including, for example, a capacitive proximity sensor, photoelectric sensor, and/or an inductive proximity sensor. In some embodiments, in which wireless communication system 100 is configured to operate with minimum power consumption, proximity sensor 125 may be adjusted to a very short range to limit the engagement of wireless communication system 100 for only attempts of NFC communication. In other embodiments, proximity sensor 125 may be separated from the rest of components of wireless communication system 100. For example, when wireless communication system 100 is part of an ATM, proximity sensor 125 may be place in an entrance door to the ATM room, or in the proximity of the keyboard of the ATM.

Figure 2:
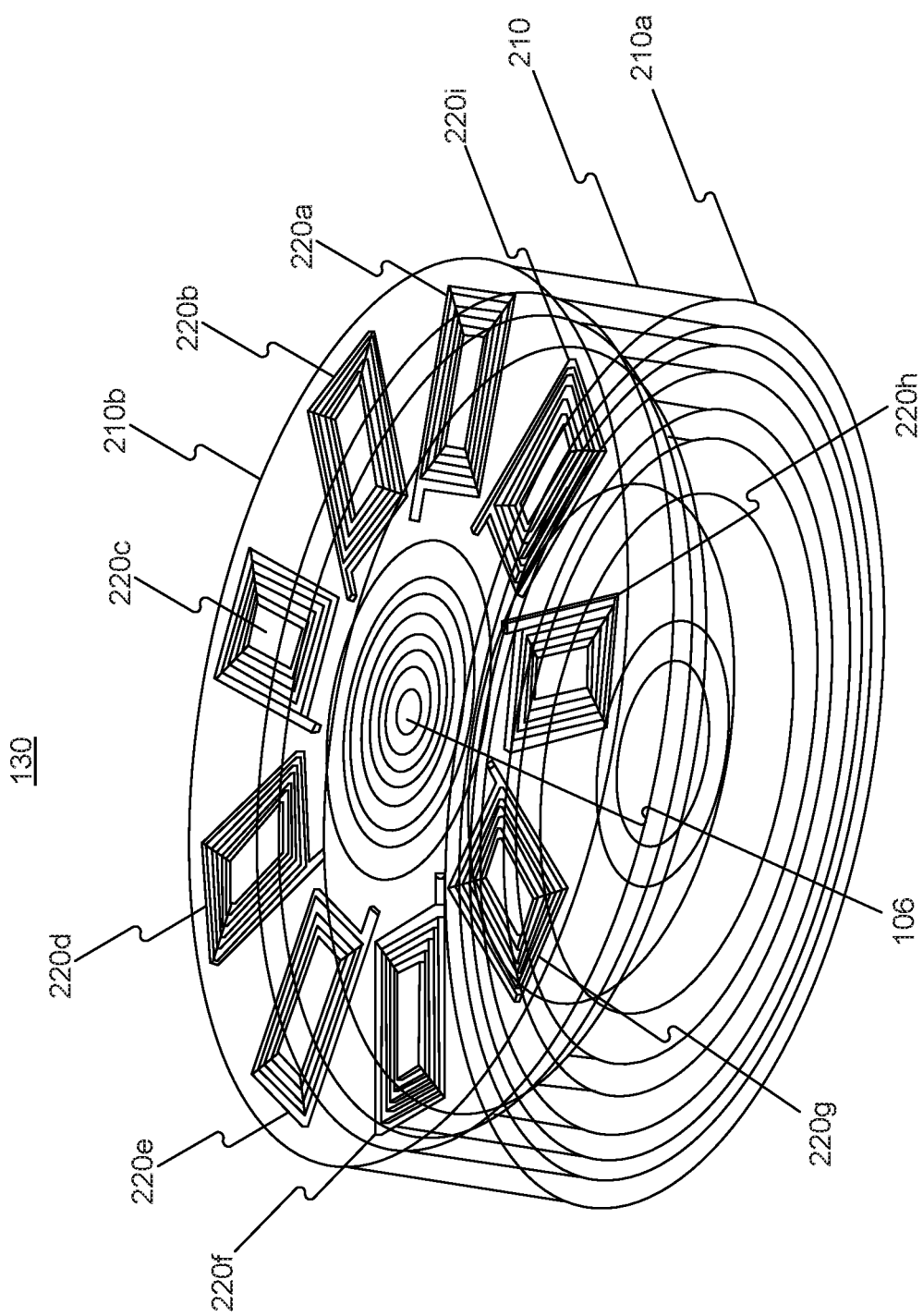
FIG. 2 is a schematic of a communication array consistent with disclosed embodiments.

FIG. 2 is a diagram of a communication array 130 consistent with disclosed embodiments. Communication array 130 may include a base 210, coils 220, and an actuator 106. In some embodiments, coils 220 may be implemented with one or more antennas.

Base 210 may be fabricated with a solid nonconductive substrate such as silicon, silica, glass, or polymers. In other embodiments, base 210 may be formed of a conductive material and be coated with nonconductive materials. For example, base 210 may be formed with a metallic substrate and be coated with an isoelectric epoxy or other polymeric isolation. Additionally, if base 210 is metallic, base 210 may be topped with high permeability sheets (ferrite, iron based, whatever) between base 210 and coils 220 to minimize signal degradation caused by the ground plane. In other embodiments, base 210 may be fabricated with a flexible substrate. For example, base 210 may be formed with polyethylene terephthalate (PET), polyethylene-naphthalate (PEN), polyimide (PI), paper, or foil.

In some embodiments, as shown in FIG. 2, base 210 may be shaped as a disk with a recesses in the middle to create elevation angles different than zero degrees, with respect to a base reference plane. In some embodiments, the base reference plane which may be parallel to the bottom of base 210. For example, a top surface 210b of base 210 may be inclined towards the center that creates elevation angles with respect to a reference plane that is parallel to a bottom surface 210a of base 210. In other embodiments, however, base 210 may have a different shape to generate the varied elevation angles. For example, base 210 may be shaped as a cone or a pyramid. In such embodiments, the elevation angle of coils 220 would be determined by the cone or pyramid slant angle. Alternatively, base 210 may be shaped as a prism with multiple faces. Then, the elevation angle of coils 220 may be defined by the orientation of the prism faces. Alternatively, or additionally, base 210 may have a flat top surface 210b parallel to bottom surface 210a but nevertheless create an elevation angle of coils 220 with bumps patterned on the top surface 210b used to modify the elevation angle.

Coils 220 may be loop coils tuned for wireless communication. For example, coils 220 may be square loop coils tuned to frequencies around 13.56 MHz for NFC communication. In some embodiments, coils 220 may formed with wires of conductive material. In other embodiments, coils 220 be printed on base 210 with a conductive ink. In yet other embodiments, coils 220 may be stickers with embedded conductive material that can be fixed on base 210.

In some embodiments, as shown in FIG. 2, coils 220 may be arranged radially on top surface 210b. The radial arrangement of coils 220 may facilitate individual connection of coils 220 with actuator 106, which may be disposed in the middle of base 210, and simplifies fabrication of the base 210. In addition, the radial disposition of coils 220 as shown in FIG. 2 enables a spherical radiation of RF fields to facilitate finding a target device. However, other arrangements of coils 220 are also possible. For example, coils 220 may be arranged in a matrix or may be arranged in concentric circles around actuator 106. Additionally, or alternatively, coils 220 may be disposed in the periphery of base 210 or in crossing directions on top surface 220b.

In other embodiments, coils 220 may be arranged on other surfaces of base 210 different from top surface 210b. For example, coils 220 may be disposed on the sides of base 210.

FIG. 2 shows an embodiment of communication array 130 with nine square coils 220a-220i. However, as it will be shown in FIGS. 3-5, there may be a different number of coils 220 in communication array 130. For example, instead of having an uneven number of coils 220, communication array 130 may be an even number of coils that are symmetrically arranged on top surface 210b. Such arrangement may improve the uniformity of RF fields generated by coils 220. Further, in some embodiments, communication array 130 may include hundreds of coils 220 to improve the accuracy of each one of the coils and cover a broad surface of potential NFC target interaction. In yet other embodiments, communication array 130 may include coils 220 of different size and/or different shape. The variety of shape and size in coils may facilitate finding strong coupling with the NFC target because matching coils are likely to have better coupling.

Actuator 106 may be implemented as a relay switching system that can be configured to selectively connect the coils 220 with controller 120. For example, actuator 106 may include a plurality of input terminals connecting to each one of coils 220 and an output terminal connected to controller 120, filter 113, and/or amplifier 114.

In other embodiments, actuator 106 may be implemented with a multiplexor that is controllable to selectively connect coils 220 and controller 120 communication modules. For example, actuator 106 may include a multiplexor that connects coils 220 individually, or in groups, with controller 120.

In some embodiments, actuator 106 may include coaxial contacts designed to avoid reflectance of RF power back toward the source. Also, the connection between coils 220 and actuator 106 may include impedance matching circuitry to maximize the power transfer and/or minimize signal reflection in the connections between coils 220 and controller 120. In some embodiments, the impedance matching circuitry may include buffer circuits that include operational amplifiers and/or transistor arrangements.

Figure 3:
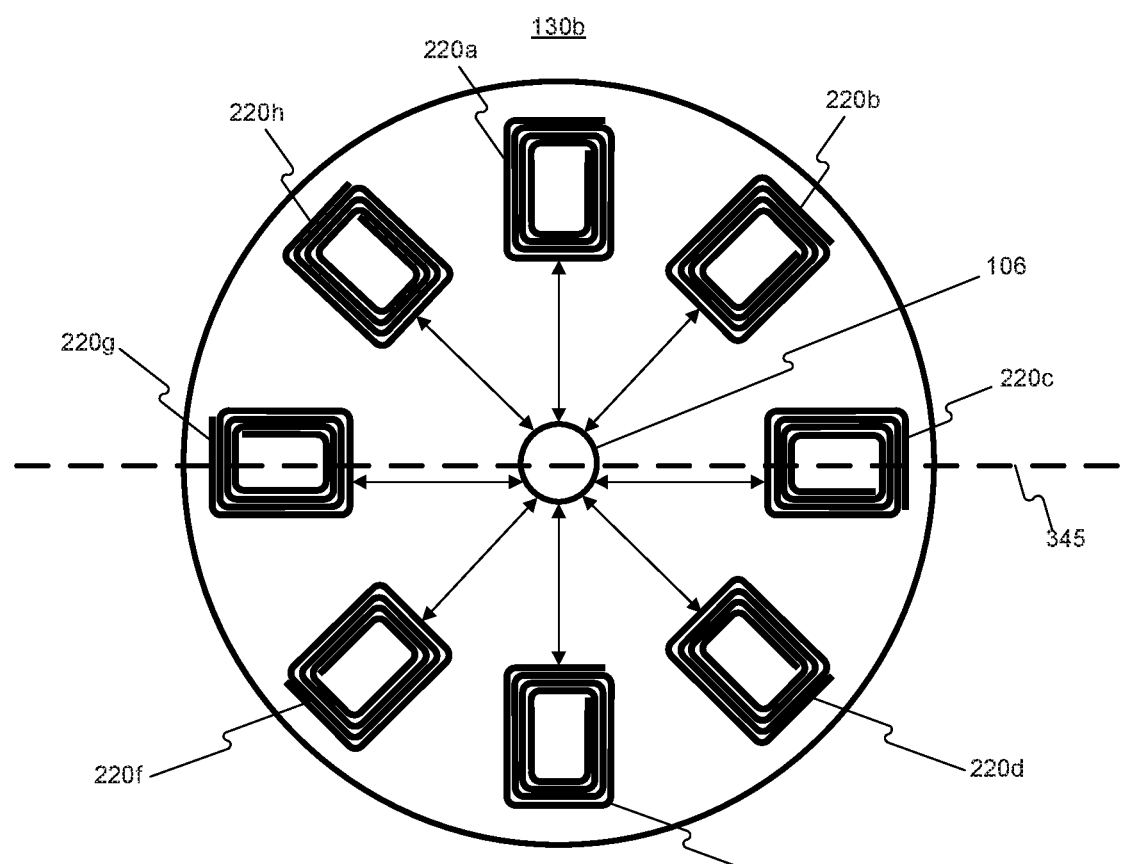
FIG. 3 is a top view of the communication array of FIG. 2.

FIG. 3 is a top-view schematic of another exemplary communication array 130b that includes eight coils 220a-220h. In this embodiment, the coils are also arranged radially in the periphery of base 210 but unlike the embodiment of FIG. 2, coils are symmetrical with respect to the center of the base. In addition, FIG. 3 shows actuator 106 in the middle of base 210 and equidistant from all coils 220.

As shown in FIG. 3, actuator 106 may be equidistant to each one of coils 220 to facilitate impedance matching and minimize performance deficiencies because, as noted above, impedance differences and discontinuities may affect signal transfer.

Figure 4:
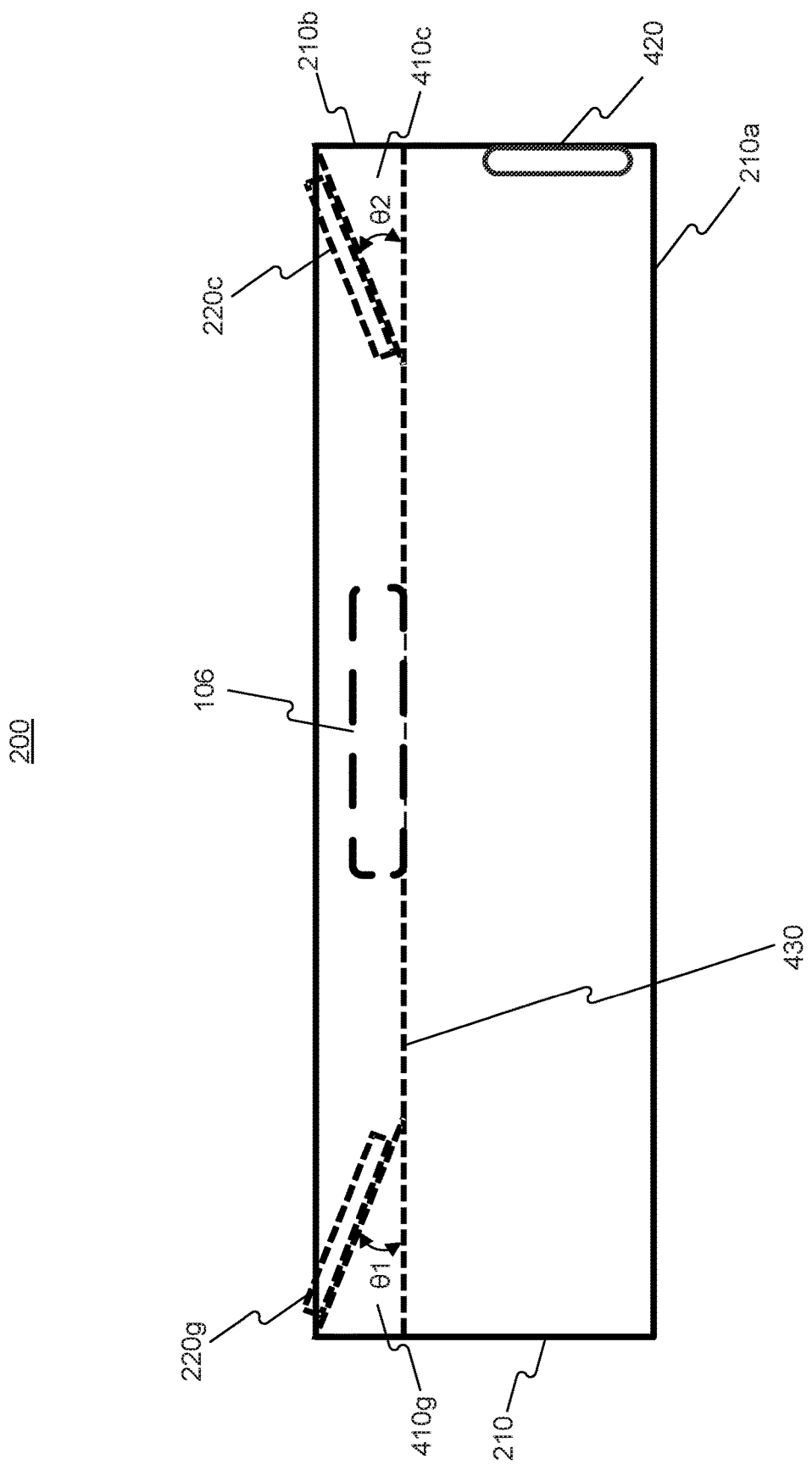
FIG. 4 is a cross-sectional view of the communication array of FIG. 2.

FIG. 4 is a cross-sectional schematic of a communication array 130 consistent with disclosed embodiments, taken along the line 345 in FIG. 3. FIG. 4 shows two of coils 220 (coils 220g and 220c) arranged on top surface 210b of base 210, and actuator 106 and an input/output terminal 420 on base 210. Input/output terminal 420 may connect actuator 106 to with controller 120 to transmit signals and operating power for actuator 106.

FIG. 4 shows that coils 220c and 220g have elevation angles 410c and 410g with respect to a reference plane 430. As shown in FIG. 4, reference plane 430 may be parallel to bottom surface 210a. Alternatively, in other embodiments reference plane 430 may not be parallel to the bottom surface 210a, having a difference reference point. For example, reference plane 430 may be a plane that cuts diagonally to base 210 or may have an inclination with respect to bottom surface 210a. These alternative implementations of reference plane 430 may be useful when the field of the coils is intended to be directed to a specific area with respect to the base.

Elevation angle 410g indicates the elevation angle of coil 220g, that is, the angle measured between reference plane 430 and the plane of coil 220g. In some embodiments, as shown in FIG. 4, elevation angle 410g may be between 2 and 30 degrees. However, elevation angle 410g may be larger or smaller. For example, elevation angle 410g may be above 30 degrees, between 30 and 60 degrees. Indeed, elevation angle 410g may be between 0 degrees and 89 degrees. However, in other embodiments elevation angle 410g may be only between 1 and 5 degrees. Even such small elevation angles may have an important effect on NFC communication reliability because small misalignments may result in unreliable communication. Misalignments of even these few degrees may prevent proper inducement of power in the NFC target or may introduce noise that prevents accurate communication. Thus, having coils 220 with elevations angles such as elevation angle 410g result in better alignment with the target even with small elevation angles.

Elevation angle 410c indicates the elevation angle of coil 220c. In some embodiments, elevation angle 410c may mirror elevation angle 410g. For example, if the magnitude of elevation angle 410g is 5 degrees, elevation angle 410c may also have a magnitude of 5 degrees. Communication arrays 200 with mirroring elevation angles may be easier to fabricate because they can be fabricated with symmetrical molds. Moreover, when elevation angles 410 have the same magnitude it is possible to print arrangements of the coils with the same design. Therefore, in some embodiments each one of coils 220 may have the same elevation angle magnitude.

However, in other embodiments, elevation angle 410c may be different from elevation angle 410g. Indeed, for certain applications it may be desirable to have varied coverage with different elevation angles for coils 220a-h. For example, if the magnitude of elevation angle 410g is 5 degrees, the magnitude of elevation angle 410c may be 15 degrees. Differences in elevation angles may complicate the fabrication process, requiring machining of each portion of top surface 210b for the specific coil. Nonetheless, the added coverage of multiple elevation angles may facilitate communication in some applications. Particularly, when wireless communication system 100 is used for an application in which it is likely to have asymmetrical misalignments between the communication array 130 and a target NFC device, elevation angles 410 may be different. In such embodiments, elevation angles may have different magnitudes and be within the range of 0 to 89 degrees with respect to reference plane 430.

Figure 5A:
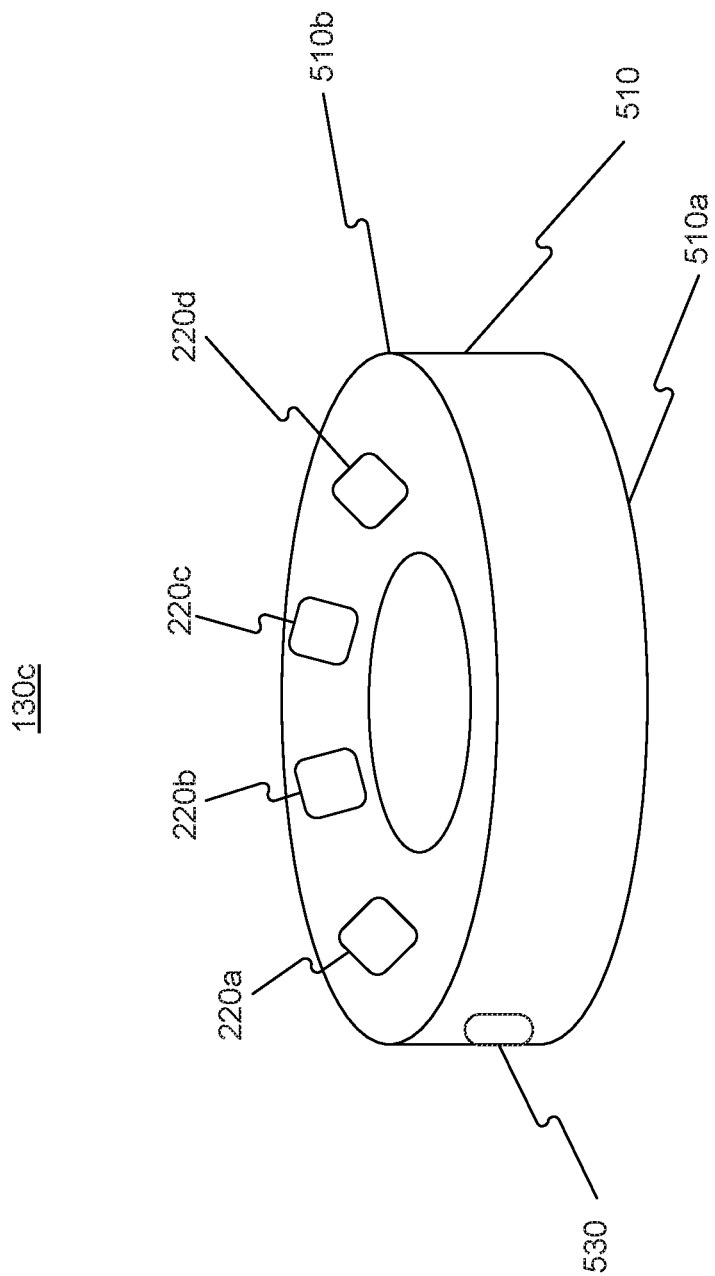
FIG. 5A is a diagram of a concave communication array consistent with disclosed embodiments.

FIG. 5A shows a communication array 130c having a concave configuration. Concave communication array 130c presents an alternative embodiment to communication array 130, and achieves the desired plurality of RF field directions by arranging communication coils 220 on a top concave surface 510b.

Concave communication array 130c includes a base 510 with a bottom surface 510a and a top concave surface 510b. In some embodiments, bottom surface 510a may be a flat surface. However, in other embodiments base 510 may have symmetric opposing surfaces and bottom surface 510a may also be concave. In addition, concave communication array may include input/output terminal 530 replicating the input/output terminal 420 and connecting concave communication array 130c with other elements of wireless communication system 100 such as actuator 106.

In concave communication array 130c, coils are disposed on the concave surface. As shown in FIG. 5, coils 220a-220d are disposed in the top concave surface of communication array. In some embodiments, coils in concave communication array 130c may be on the surface and follow the curvature of the surface. For example, coils 220 may be printed coils that follow the curvature of the concave surface. However, in other embodiments, coils 220 may be rigid and simply be tilted by the curvature of top surface 510b. In such embodiments, coils 220 may be fixed to base 510 with an epoxy or other seal that fills gaps between the curved surface and the rigid coil.

Figure 5B:
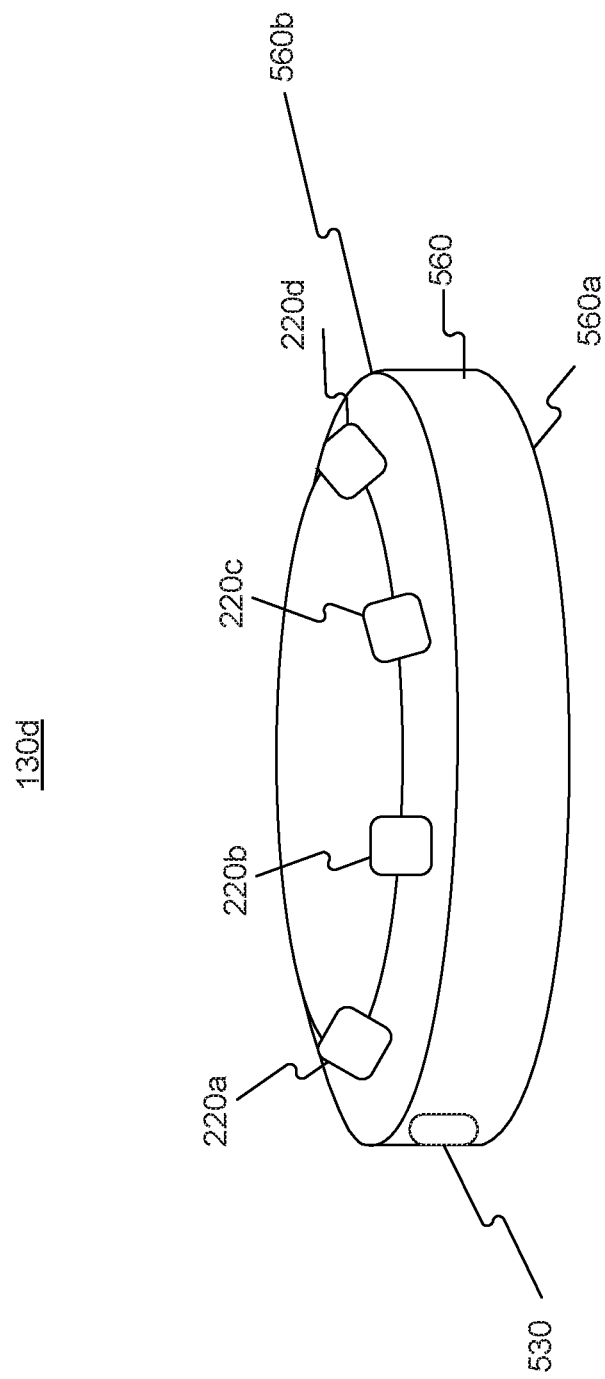
FIG. 5B is a diagram of a convex communication array consistent with disclosed embodiments.

With varying distances between the coil locations and the edge of top surface 510b, the concave curvature of base 510 may provide elevation angles for coils 220 that allow covering a wider RF filed. In some embodiments, the elevation angle with respect to a reference plane parallel to bottom surface 510a may be substantially equal for all coils 220. For example, coils 220 may have a substantially equal elevation angle when difference between angles is up to ±5 degrees. Alternatively, substantially equal elevation angles may be ±1 degree, or for more precise applications, it may be ±0.5 degrees. Moreover, the orientations of coils 220 also vary according to their position around the circumference of top surface 510b FIG. 5B is a schematic of a convex communication array 130d consistent with disclosed embodiments. Convex communication array 130d presents an alternative embodiment to communication array 130 and concave communication array 130c. Convex communication array 130d achieves the desired plurality of RF field directions by arranging communication coils over a top convex surface 560b.

Convex communication array 130d includes a base 560 with a bottom surface 560a and a top convex surface 560b. Base 560 may be similar to base 210 but be shaped with a top convex surface 560b. In addition, convex communication array 130d may include a bottom surface 560a and input/output terminal 530 for communication with other elements of wireless communication system 100. In some embodiments, convex communication array 130d may have symmetric surfaces and bottom surface 560a may also be convex, like top convex surface 560b. However, in other embodiments, bottom surface 560a may be flat. Like in concave communication array 130c, input/output terminal 530 may include impedance matching circuitry to maintain quality of the signal received from coils 220 when it is transmitted to, for example, controller 120.

In convex communication array 130*d*, coils may be disposed on top convex surface 560*b*, as shown in FIG. 5B. In such embodiments, coils 220 may follow the curvature of the surface. For example, coils 220 may be printed coils that follow the curvature of the convex surface. However, in other embodiments, coils 220 may be rigid and be attached to the convex curvature with an epoxy or seal that fixes coils 220 to the base 560. With different distances between coil positions the edge of top convex surface 560*b*, different elevation angles for coils 220 provide the desired spherical coverage to reliably engage in NFC communication.

FIGS. 6A-6E show exemplary coils and/or antennas for wireless communication consistent with disclosed embodiments. Coils presented in FIGS. 6A-6E may be used to implement one or more of coils 220.

Having a matching shape between coils may be beneficial to improve NFC reliability. For example, communication between two circular coils may be more reliable than the communication between a square coil and a circular coil because more effective coupling may occur when the coils have matching shapes. That is, when both initiator and target have the same shape of coil, most of the RF field generated by the initiator is used to induce the coil in the target. In contrast, when a square coil tries to communicate with a loop coil, at least some portion of the electric field is not used and may generate noise. For example, the electric field of the edges of the square coil is not captured effectively by a circular coil. Thus, in some embodiments it may be beneficial to use different shapes and sizes of coils in communication array 130. Different shapes increase the probability of establishing reliable links between at least one of coils 220 and a target, thus facilitating communication. FIGS. 6A-6E disclose coil and/or antennas of different sizes and shapes that may be used in communication array 130.

Figure 6C:
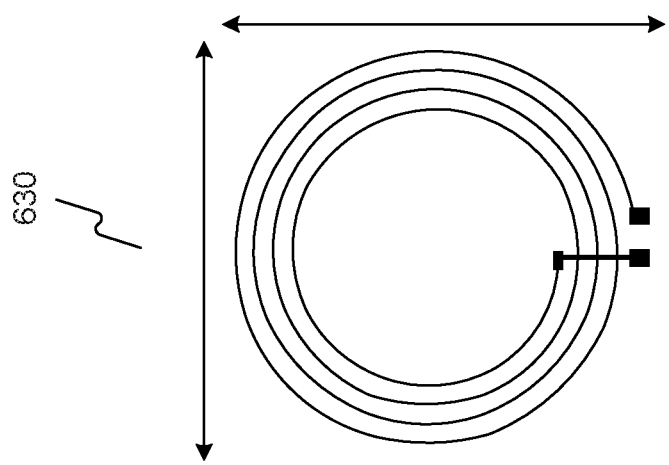
FIG. 6C is a third exemplary coil for wireless communication, consistent with disclosed embodiments.
Figure 6B:
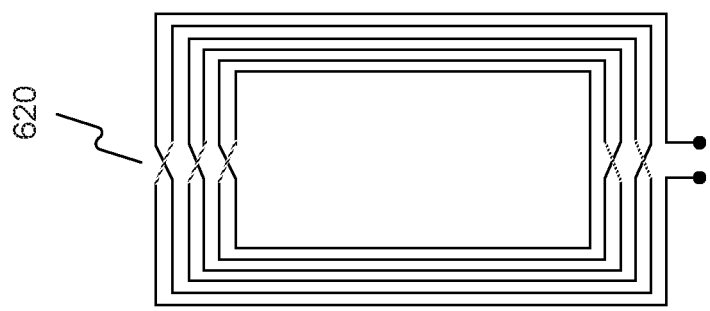
FIG. 6B is a second exemplary coil for wireless communication, consistent with disclosed embodiments.
Figure 6A:
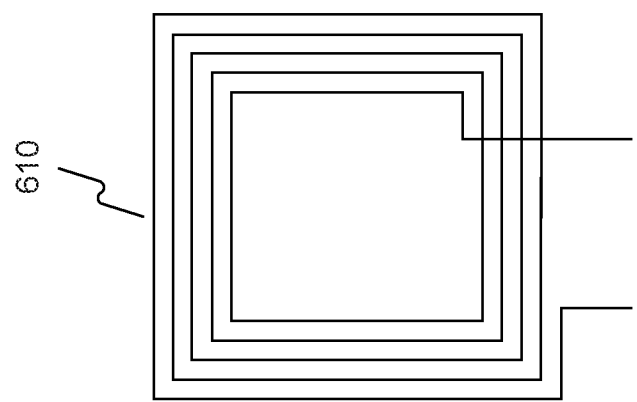
FIG. 6A is a first exemplary coil for wireless communication, consistent with disclosed embodiments.

FIG. 6A shows a square loop coil 610. Square loop coil 610 may be used in communication array 130 by implementing coils 220 as a plurality of square loop coils 610. Alternatively, at least one but not all of coils 220 may be implemented with the square loop coil 610.

FIG. 6B shows a rectangular loop coil 620. Rectangular loop coil 620 is frequently used for NFC communication and as shown in FIGS. 2 and 3, it may be used for coils 220 in communication array 130. In some embodiments, rectangular loop coils 620 of different dimensions may be used in communication array 130. For instance, some of rectangular loop coils 620 may have a width to height ratio of 2:1, while other rectangular loop coils 620 may have a ratio of 1:3. Alternatively, at least one but not all of coils 220 may be implemented with the rectangular loop coil 620 to provide varied shapes of coils and improve the probability of finding strong links.

FIG. 6C shows a circular loop coil 630. Circular loop coil 630 may be used for coils 220 in communication array 130. Like rectangular loop coils 620, circular loop coils 630 may have different width and height ratio. In some embodiments, at least one but not all of coils 220 may be implemented with the circular loop coil 630 to provide varied shapes of coils and improve the probability of finding strong links.

Figure 6E:
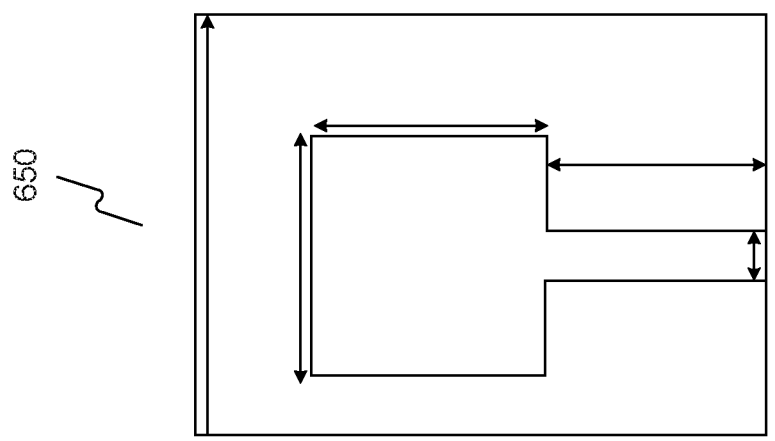
FIG. 6E is a second exemplary antenna for wireless communication consistent with disclosed embodiments.
Figure 6D:
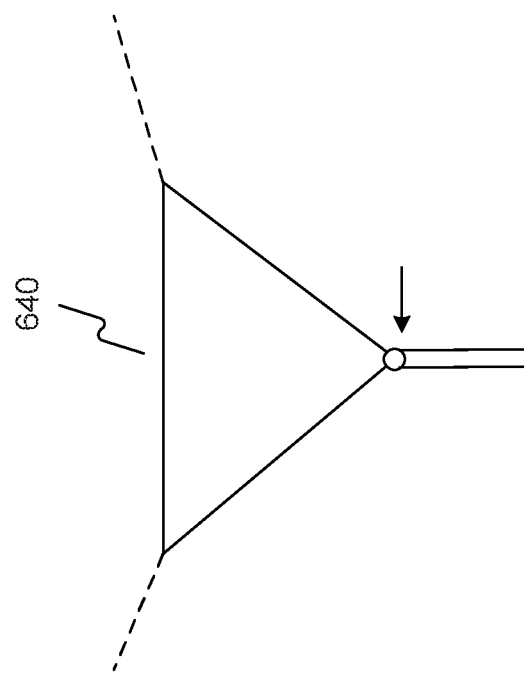
FIG. 6D is a first exemplary antenna for wireless communication consistent with disclosed embodiments.

FIG. 6D shows a triangular microstrip antenna 640 and FIG. 6E shows a square microstrip antenna 650. These microstrip antennas can also be implemented as on or more of coils 220. While microstrip antennas are not used in all NFC communication, they have geometric characteristics that may be beneficial for certain applications of communication array 130. For example, microstrip antennas such as 640 and 650 are light weight, have a low volume, and have a planar configuration. Therefore, microstrip antennas may be used in communication array to provide additional varied coverage to facilitate reliable links with an NFC target. Moreover, because microstrip antennas 640 and 650 are inexpensive to fabricate and can be conformally formed on the concave and convex surfaces, these antennas may be used to lower manufacturing cost, support both linear and circular polarization, provide capability of multiband operation, and enhance the robustness of communication array 130 mechanical.

Figure 7:
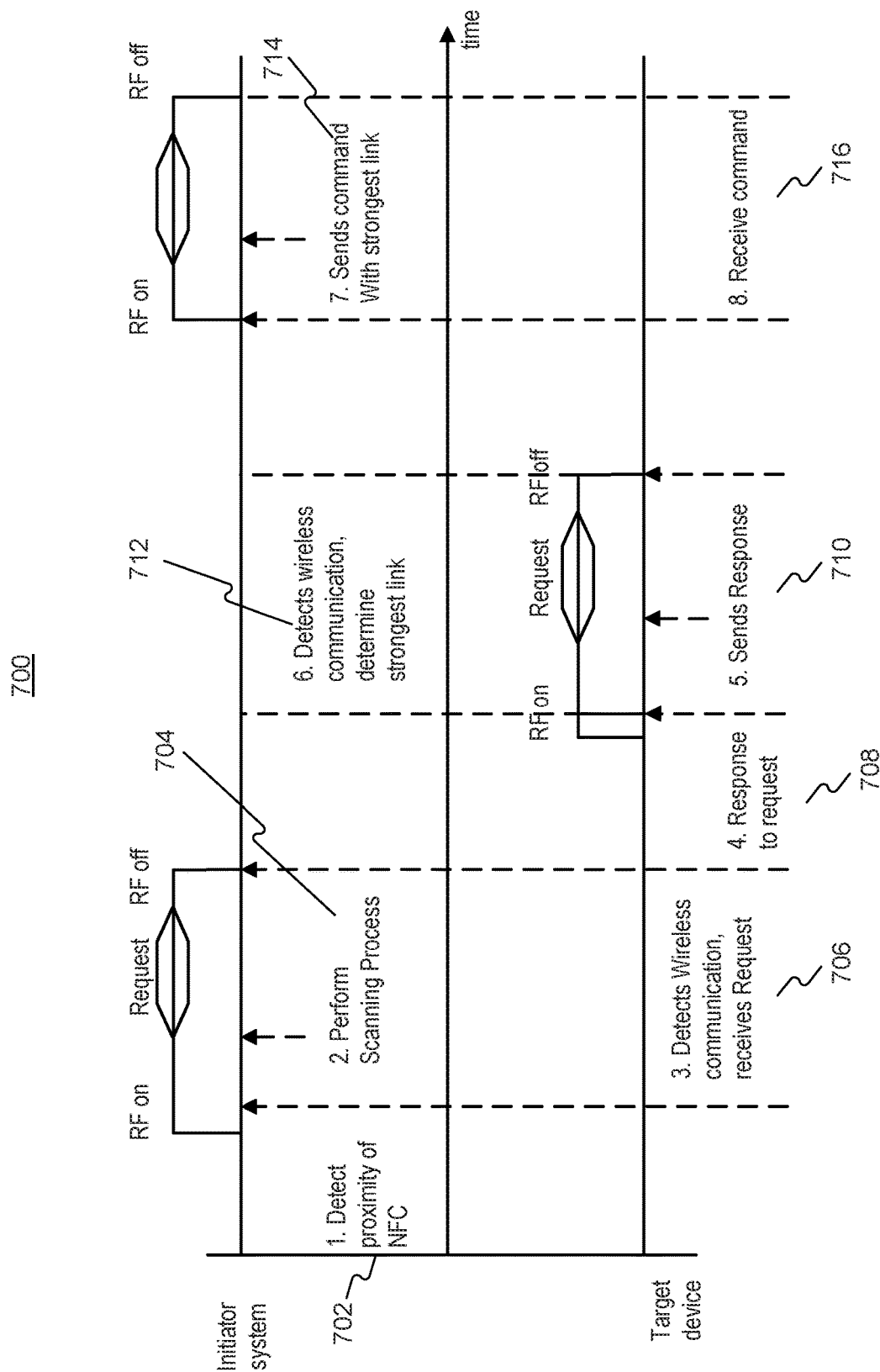
FIG. 7 is an exemplary communication initiation timeline consistent with disclosed embodiments.

FIG. 7 is an exemplary communication initiation timeline 700 consistent with disclosed embodiments. Communication initiation timeline 700 may be implemented between an initiator system, such as wireless communication system 100, and a target device that is seeking to complete a transaction or identify a user. For example, communication initiation timeline 700 may be implemented between an ATM that includes wireless communication system 100 and a smartphone of credit card. In some embodiments, as it will be described below, steps of the initiator system in initiation timeline 700 may be implemented by controller 120. However, other elements of wireless communication system 100 may implement the initiator system steps. For example MCU 117 or wireless module 118 may implement the initiator system steps of communication initiation timeline 700. In addition, steps of the target device in initiation timeline 700 may be implemented by an external NFC device.

In step 702, controller 120 may detect the proximity of an NFC device. In some embodiments, the detection may be done by identifying response signals from an NFC enabled device. For example, controller 120 may identify that a target device may be close to communication array 130 because it receives a response signal via coils of communication array 130. In such embodiments, the NFC communication may be in a perpetual active mode listening for NFC responses. While this detection method may increase overall power consumption, it may simplify the system by minimizing the number of required components. In other embodiments, the detection of NFC device in step 702 may be done via other signals unrelated to NFC communication. For example, the detection of proximity of the device may be based on proximity sensor 125 in wireless communication system 100. For example, proximity sensor 125 may be located close to a user interface and detect movement of a system that may communicate via NFC. Alternatively, or additionally, an operator of wireless communication system 100 may interact with wireless communication system 100 to indicate a the proximity of an NFC enabled device. For example, when wireless communication system 100 is part of a payment terminal, a cashier may send a signal to controller 120 indicating the proximity of an NFC device.

As shown in step 704 of FIG. 7, controller 120 may activate RF modules and send a scanning request. For example, controller may turn on wireless module 118 and power actuator 106 in step 704. In some embodiments, the scanning request may sequentially transmit probing signals via each of coils 220. These probing signals may be used by controller 120 to determine a selected coil from coils 220 with the best coupling. Additionally, or alternatively, probing signals may include an RF request that, when transmitted by coils 220, determines whether a target device is in the vicinity of communication array 130.

In step 706, the target device may receive a RF request from at least one of coils 220. The target device normally does not have the ability to identify which one of the coils 220 sent the request, but it may nevertheless prepare to broadcast a response to the requests in step 708. In embodiments in which the target device is an active device, such as smartphone, after step 708 the target device may activate RF modules in the target device to respond to the request received in step 706. Of course, in embodiments in which the target device is passive and includes only an NFC tag, no RF modules are activated, and instead only passively responds to the request in step 710.

In step 712, controller 120 may detect the signal emitted from the target device and select a coil or coils with the strongest coupling, using actuator 106. Controller 120 may process the information received and, in step 714, prepare and send a communication command. For example, controller 120 may engage wireless module 118 to analyze the signal received from the target device and generate a response that initiates communication. Thus, in step 714 controller 120 may send the communication request using the selected one or more coils 220 that is associated with the strongest coupling.

In step 716, the target device may receive the communication command. In some embodiments the communication may terminate after the target device receives the command. For example, for wireless identification applications, in which it is only necessary to establish the identity of the wireless device, communication initiation timeline 700 may end with the reception of command in step 716. However, in embodiments where the target device will exchange information with the system, a series of additional communications and responses may continue after step 716. For example, when the communication is between a smartphone and a payment terminal, the communication may include authentication steps to secure the transaction.

Figure 8:
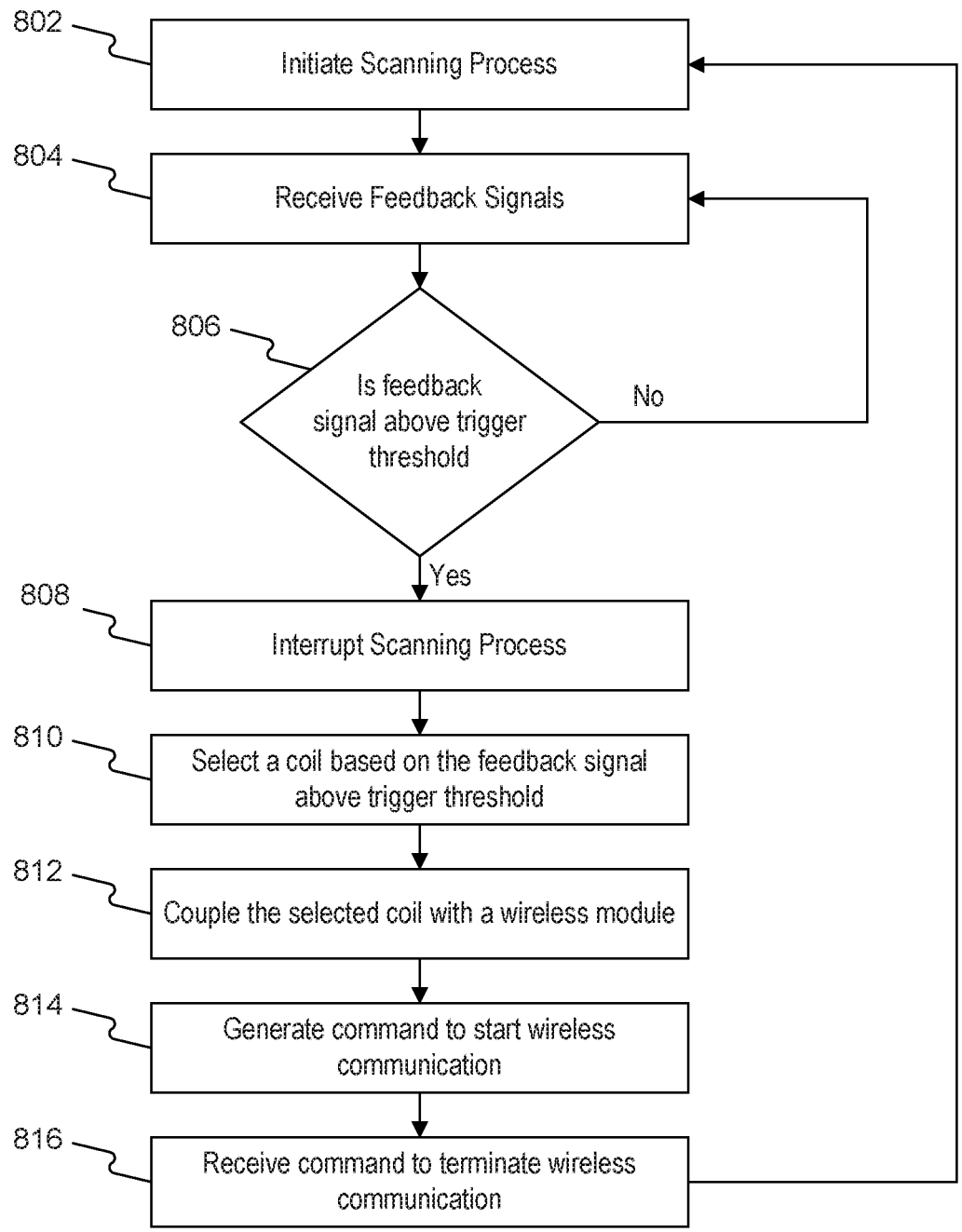
FIG. 8 is an exemplary flow chart illustrating a wireless communication process consistent with disclosed embodiments.

FIG. 8 is an exemplary flow chart illustrating a wireless communication process 800 consistent with disclosed embodiments. In some embodiments, as described below, process 800 may be implemented by controller 120. However, in other embodiments, other elements of wireless communication system 100 may implement process 800 or parts of process 800. For example, cryptographic processor 116, MCU 117, or wireless module 118, may implement a portion or the entirety of process 800. Additionally, a processing unit external but coupled to wireless communication system 100 may perform a portion or the entirety of process 800.

Process 800 may begin with step 802 in which controller 120 may initiate a coil scanning process. In some embodiments, controller 120 may initiate scanning process as part of wireless communication system 100 boot-up and interrogate each one of coils 220. That is, any time wireless communication system 100 is turned on, controller 120 initiates the coil scanning process by default. In other embodiments, the scanning process may be initiated by some elements of wireless communication system 100. For example, is some embodiments the scanning process of step 802 may be initiated by a signal from proximity sensor 125. In such embodiments, step 802 may be executed when proximity sensor 125 detects the presence of a target device. In other embodiments, step 802 may be performed whenever power management 110 begins operation. For example, any time power management 110 is receiving power, controller 120 may initiate the scanning process of step 802.

The scanning process may include a sequential connection between the coils and controller 120 to measure feedback signals. For example, for the scanning process controller 120 may configure actuator 106 to sequentially connect controller 120 with each one of the coils for a determined time. In other embodiments, the scanning process may be random. For example, controller 120 may configure actuator 106 to connect with a randomly selected coil to gather feedback signals. In other embodiments, the sequence of connection between the controller 120 and the coils may be defined by the location of the coils. For example, when the scanning process of step 802 is applied to communication array 130, the selected coil for scanning may be alternating between the top portion and the bottom portions of communication array 130. In this way, the scanning process may more quickly identify a coil that will provide reliable communication. In yet other embodiments, controller 120 may implement search algorithms to identify coil 220 with the strongest coupling. For example, controller 120 may implement an A* search algorithm to identify a coil 220 with the strongest link. Additionally, or alternatively, controller 120 may scan coils 220 with permutating algorithms such as Heap's algorithm to identify the strongest link.

In step 804, controller 120 may receive the feedback signals from the scanning process. The feedback signals may include a current value associated with coils. For example, the feedback signals may be a response current measured in micro or milliamps. In other embodiments, however, the feedback signals may be in other forms, such as voltage or signal-to-noise (SNR). In yet other embodiments, the feedback signal may be a digital signal.

In some embodiments, controller 120 may store the feedback signals in memory and then wait to gather at least one feedback signal for each one of coils 220 before comparing all of them. In this way, controller 120 would identify and select the strongest possible link available in communication array 130. In other embodiments, controller 120 may process signals as they are received and simply identify a signal that is above a trigger threshold, without any required comparison between signals. This approach may expedite the communication. because it process the signals in real-time and does not require collection the larger sample of feedback signals before continuing to step 806, but it may not find the strongest link for communication.

In step 806, controller 120 determines the strongest signal or whether at least one of the signals is above the trigger threshold. For example, in embodiments in which the feedback signal is current, controller 120 may identify the highest current or determine whether the feedback current is above a minimum feedback current required to establish communication. In such embodiments, controller 120 may be programmed to only establish communication if the feedback signal is above a threshold current level because such current level is the minimum necessary to provide reliable NFC communication. For example, controller 120 may only initiate communication with a selected coil if the feedback signal is above a threshold that could allow Manchester coding and/or modified miller coding for NFC communication.

In other embodiments, however, the trigger threshold may be a different value selected by the user. For example, a user that has a strong interest in secure communication may require feedback signals with higher thresholds than a user interested in faster communication. Requiring larger feedback thresholds could result in closer coupling between the NFC device and the initiator. Such communication could be more difficult to establish but could reduce chances of spoofing attacks and improve the communication's security. On the other hand, feedback signals with lower thresholds could permit greater distance between the target and the initiator, allowing faster connections but could be more susceptible to spoofing attacks.

In yet other embodiments, the trigger threshold may be a signal-to-noise ratio of the feedback signal. In step 806, controller 120 may sample the feedback signal and estimate an SNR. If the estimated SNR is above a threshold that is required for reliable NFC communication, controller 120 may determine that the feedback signal is above the threshold for communication.

When controller 120 determines that none of the feedback signals are above the trigger threshold (step 806: No), controller 120 may return to step 804 and continue receiving feedback signals from the scanning process. However, if controller 120 determines at least one feedback signal is above the trigger threshold (step 806: Yes), controller 120 may interrupt the scanning process and continue to step 808. In some embodiments, interrupting the scanning process leaves actuator 106 coupled to the coil with the feedback signal that is above the threshold. Specifically, when controller 120 process signals in real time, controller 120 may stay coupled to a coil 220 with a feedback signal above the threshold by interrupting the scanning process.

In step 810, controller 120 may select a coil from the plurality of coils based on the feedback signal above the trigger threshold. For example, controller 120 may identify a selected coil after comparing all feedback. Alternatively, or additionally, the selection of the selected coil may also be based on secondary considerations. For example, controller 120 may determine not only the magnitude of the feedback signal but also an associated SNR to determine the selected coil. In such embodiments, a coil associated with the highest feedback signal may not be selected if it is also associated with a noisy signal. In this way, controller 120 may target to couple with the coil that is likely to provide the best communication in step 810. In certain applications, a group of several coils 220 may be selected to provide the most reliable communication.

In step 812, controller 120 may configure actuator 106 so it gets coupled with the selected coil 220. For example, controller 120 may configure actuator 106 to couple the selected coil with wireless module 118.

In step 814, controller 120 may generate a command to start wireless communication. For example, controller 120 may provide instructions to wireless module 118 to transmit and receive NFC signals to and from the selected coil or coils via actuator 106.

In step 816, controller 120 may receive or generate a command to terminate the communication. For example, controller 120 may receive from an NFC device a termination command that indicates the NFC communication was successfully completed and that the link should be terminated. Alternatively, or additionally, controller 120 may generate a termination command when it determines that the communication has successfully completed because it no longer receives a response from the target device. In some embodiments, controller 120 may return to step 802 after step 816 and reinitiate the scanning process to prepare of a following communication. However, in other embodiments, controller 120 may enter a power-saving mode after step 816. For example, controller 120 may transmit instructions to power management 110 to enter the power-saving mode after step 816 and only restart process 800 when proximity sensor 125 detects the presence of a target device.

Figure 9:
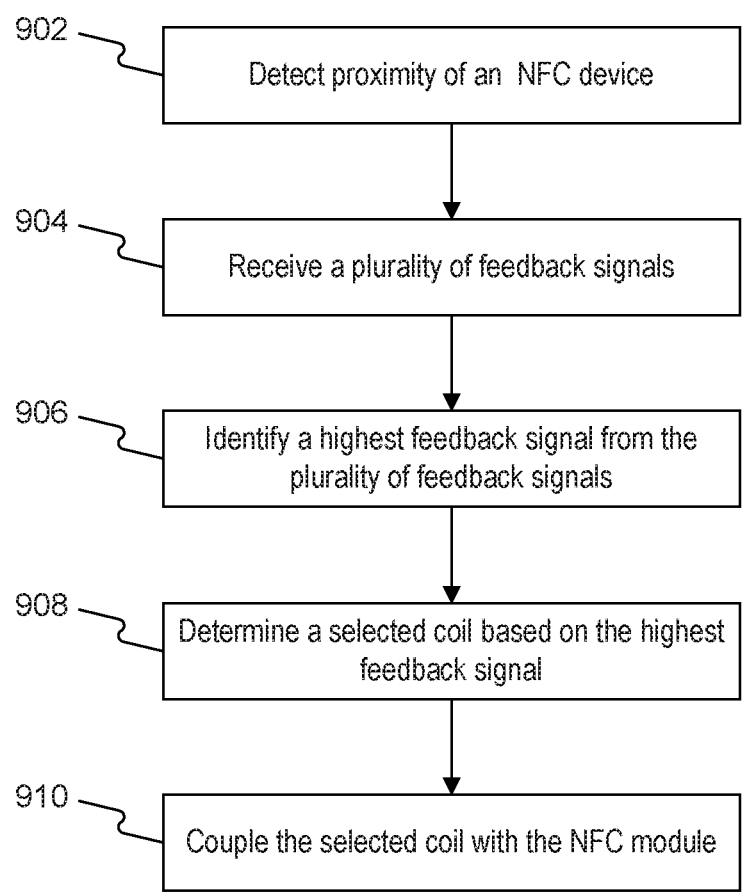
FIG. 9 is an exemplary flow chart illustrating a coil coupling process consistent with disclosed embodiments.

FIG. 9 is an exemplary flow chart illustrating a coil coupling process 900 consistent with disclosed embodiments. In some embodiments, as described below, process 900 may be implemented by controller 120. In other embodiments, however, other elements of wireless communication system 100 may implement process 900 or parts of process 900. For example, any of cryptographic processor 116, MCU 117, or wireless module 118, may implement a portion or the entirety of process 900. Additionally, or alternatively, a processing unit external but coupled to wireless communication system 100 may perform a portion, or the entirety, of process 900.

Process 900 may start in step 902, in which controller 120 may detect the proximity of an NFC device. In some embodiments, detecting the proximity of the NFC device may include detecting a response to an NFC interrogating command. In other embodiments, detecting the proximity of the NFC device may include detecting a signal from proximity sensor 125. Alternatively, or additionally, detecting proximity may include receiving a signal from a mechanical switch, such a button in a cashier machine or a button of an ATM.

In step 904, controller 120 may receive a plurality of feedback signals, each associated with one of the coils. Controller 120 may store the signals in memory unit 119 or may process the feedback signals in real-time without storing them.

In step 906, controller 120 may identify the highest feedback signal and a coil associated with the highest feedback signal. In other embodiments, in step 906 controller 120 may identify that at least one signal exceeds a threshold.

In step 908, controller may determine a selected coil based on the highest signal or the feedback signal that exceeds the threshold. For example, controller 120 may identify the selected coil associated with a highest induced current. In other embodiments, controller 120 may select a coil associated with the feedback signal with the highest SNR.

In step 910, controller 120 may couple the selected coil with a wireless communication module. For example, controller 120 may configure actuator 10 to connect the selected coil with wireless module 118.

Figure 10:
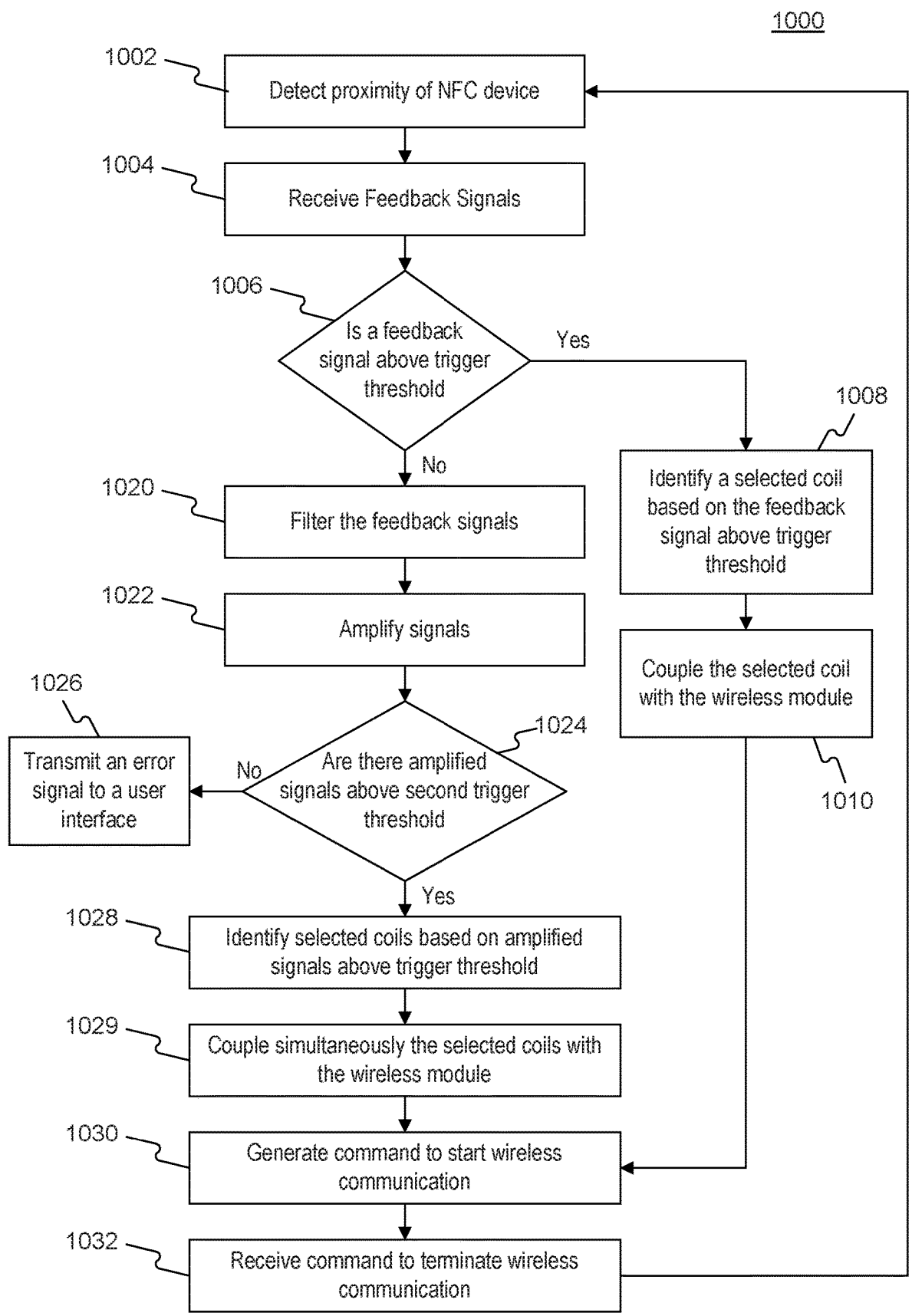
FIG. 10 is an exemplary flow chart illustrating a wireless communication process with amplified signals consistent with disclosed embodiments.

FIG. 10 is an exemplary flow chart illustrating a wireless communication process 1000 with amplified signals consistent with disclosed embodiments. In some embodiments, as described below, process 1000 may be implemented by controller 120. In other embodiments, however, other elements of wireless communication system 100 may implement process 1000 or parts of process 1000. For example, any of cryptographic processor 116, MCU 117, or wireless module 118, may implement a portion or the complete process 1000. Additionally, or alternatively, a processing unit external but coupled to wireless communication system 100 may perform a portion, or the entirety, of process 1000.

Process 1000 may start in step 1002 in which controller 120 may detect the proximity of a target device such as an NFC-enabled communication. For example, controller 120 may detect a wireless response from a smartphone or a NFC tag. In other embodiments, controller 120 may detect the proximity of an NFC device in step 1002 by receiving a signal from proximity sensor 125.

In step 1004, controller 120 may receive a plurality of feedback signals from coils 220 in communication array 130 by configuring actuator 106 to sequentially connect to each of the coils 220 with controller 120 for a specified time interval. Alternatively, or additionally, actuator 106 may be configured to sequentially couple each one of coils 220 with circuits that measure and evaluate the feedback signals.

In step 1006, controller 120 may determine whether at least one of the feedback signals is above a threshold. In some embodiments, the threshold may be a minimum feedback current that could enable NFC and Manchester coding and/or NFC and Modified Miller coding. In other embodiments, the threshold may be a user defined threshold that may be calibrated for different applications.

If controller 120 determines that at least one of the feedback signals is above the threshold (step 1006: Yes), controller 120 may continue to step 1008 to identify a selected coil that is associated with feedback signals above the threshold. Further, controller 120 may also couple the selected coil with a communication module, such as wireless module 118, in step 1010.

However, if controller 120 determines none of the feedback signals is above the threshold (step 1006: No), controller 120 may execute operations to attempt to establish communication with more than one coil. Even when the individual coils do not provide feedback signals that can be used to establish the NFC communication, communication array 130 may nevertheless establish communication by simultaneously utilizing multiple coils. This simultaneous use of coils effectively generates a coil with a larger area that may have greater transmission and reception capability. Therefore, even when controller 120 determines none of the individual coils is providing feedback signals above the threshold (step 1006: No), it may attempt to communicate using a group of coils.

In attempting to communicate even without a feedback signal above threshold in step 1006, controller 120 may filter feedback signals in step 1020. In some embodiments, controller 120 may filter the feedback signals internally by performing some digital processing. For example, controller 120 may digitize and remove outlier measurements in step 1020. In other embodiments, controller 120 may activate certain components of wireless communication system 100 to filter the signals. For example, controller 120 may activate filter 113 and reconfigure circuitry in wireless communication system 100 so feedback signals coming from the communication array 130, are filtered by filter 113. In some embodiments, filter 113 may be a high pass-band filter but in other embodiments, filter 113 may include a band-pass filter or a low-pass filter.

While the amplified feedback signal is unlikely to provide the required communication threshold, because feedback signals below the threshold may indicate the target is not being properly powered, the amplified feedback signals may let controller 120 identify which coils are getting the best reception. Thus, in step 1022 controller 120 may amplify the feedback signals to attempt to identify a group of coils with the best reception. For example, controller 120 may reconfigure the circuitry of wireless communication system 100 so feedback signals are amplified by amplified 114. Alternatively, or additionally, controller 120 may include an analog-to-digital converter that converts the feedback signals and digitally amplifies the signal. Moreover, controller 120 may amplify the signals internally with local elements of controller 120. For example, controller 120 may initiate MCU 117 to perform data processing steps that result in a higher signal.

In step 1024, controller 120 may determine whether the filtered and/or amplified feedback signals outputted from filter 113 and/or amplified 114 are above a second threshold for the combined signals. For example, controller 120 may combine the amplified signals to determine whether they have a SNR that is higher than a user-defined threshold. If controller 120 determines that the amplified signals are not above the threshold (step 1024: No), controller 120 may continue to step 1026 and transmit an error signal to a user interface. For example, in step 1026 controller 120 may communicate with a processing unit that may display a warning or error message to a user attempting NFC communication with wireless communication system 100.

However, if controller 120 determines that the filtered and/or amplified signals are above the second threshold, controller 120 may attempt the communication with the multiple coils and continue to step 1028.

In step 1028, controller 120 may identify coils that are associated with filtered and/or amplified signals above the threshold. For example, controller 120 may identify that two of the coils, when combined, generate a signal that is above the second threshold for communication. Alternatively, or additionally, controller 120 may identify coils that are introducing noise into the measurement to discard them from the communication. In step 1028, controller may additionally store identity information of coils 220 associated with feedback signals above the threshold.

In step 1029, controller 120 may simultaneously couple coils identified to have filtered and/or amplified signals above the threshold with a communication module. For example, controller 120 may configure actuator 106 to couple simultaneously multiple coils of communication array 130 with wireless module 118. The simultaneous communication may effectively create a larger antenna with better transmission and reception capability.

In step 1030, controller 120 may communicate with the selected coils as a single antenna. For example, controller 120 may instruct wireless module 118 to start the communication using the group of simultaneously connected coils. In such embodiments, controller 120 may generate an identification request or begin an exchange process with the target device. Because wireless module 118 was simultaneously coupled with multiple coils, the communication may be successful even though none of the individual coils had a sufficient feedback signal in step 1006. In other embodiments, controller 120 may directly perform the communication. For example, controller may generate and transmit signals to the group of coils to communicate with the target.

In step 1032, controller 120 may receive or generate a command that terminates communication with the target. For example, controller 120 may stop receiving signals from the target device and determine the target is now out of range and terminate communication. Alternatively, or additionally, controller 120 may receive an NFC signal terminating the communication with a termination command.

In some embodiments, once a communication has been terminated in step 1032, controller 120 may return to step 1002 and wait for the detection of an NFC device and restart the communication process. In other embodiments, however, after step 1032 controller 120 may enter in a power saving mode to wait for a next communication request. In some embodiments, in the power saving mode only proximity sensor 125 may be powered on. For example, controller 120 may send a signal to power management 110 to initiate a power saving mode until it is necessary to begin the communication process because proximity sensor 125 detects the proximity of an NFC device.

Figure 11:
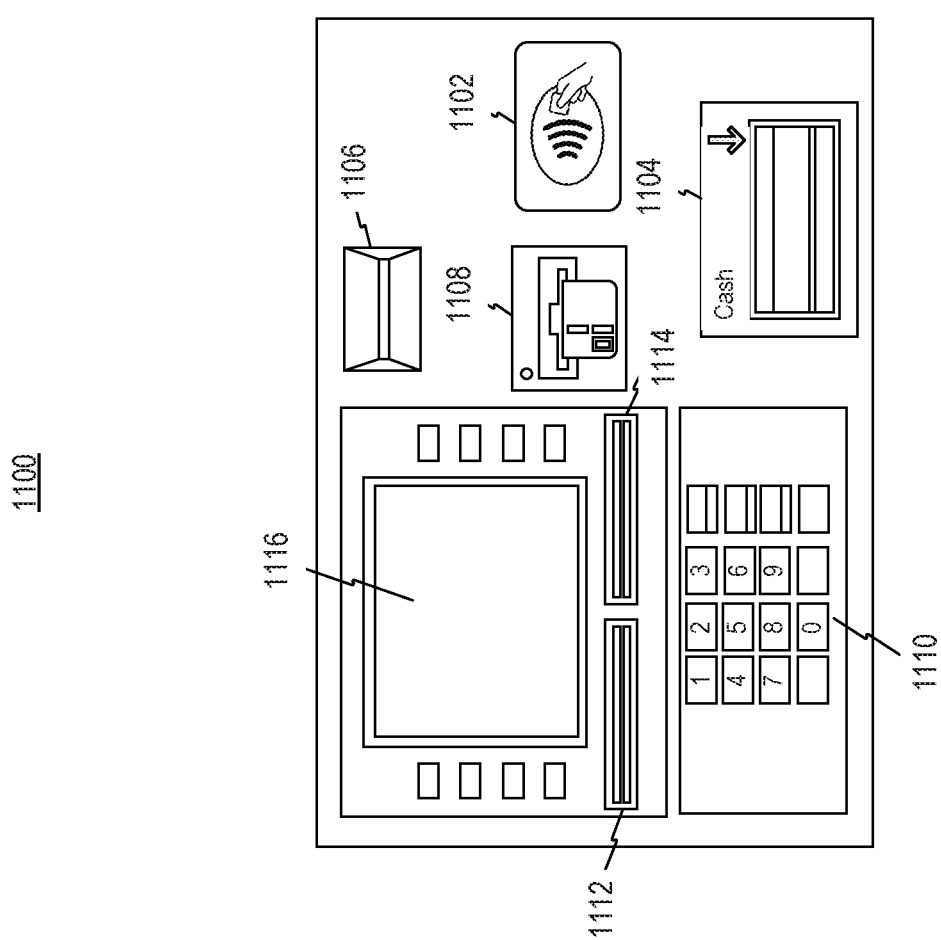
FIG. 11 is a front view of an exemplary automatic teller machine consistent with disclosed embodiments.

FIG. 11 is a front view of an exemplary automated teller machine (ATM) system consistent with disclosed embodiments. ATM 1100 may include a receipt printer 1106, a card slot 1108, and a cash dispenser 1104. ATM 1100 may also include speakers 1112 and 1114, keyboard 1110, and a display or user interface 1116. In addition, ATM 1100 may include an NFC area 1102, which may include a graphical icon associated with NFC communication. Although not visible in FIG. 11, communication array 130 may be position behind NFC area 1102. In addition, although also not visible in FIG. 11, ATM 1100 may include a CPU (to control the user interface and transaction devices), a secure cryptoprocessor, generally within a secure enclosure, function key buttons (usually close to the display) or a touchscreen (used to select the various aspects of the transaction), a vault (to store the parts of the machinery requiring restricted access), and a plurality of sensors and indicators, such as proximity sensors.

In some embodiments, ATM 1100 may be configured to grant access to an account when a user is identified with a card entered in card slot 1108 or when a user places an NFC target (such as a smartphone, a smartwatch, or a card) close to NFC area 1102.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. An apparatus for facilitating wireless communication, comprising:
    a base comprising a flat top surface and a bottom surface, the base having a reference plane parallel to the bottom surface and a plurality of bumps patterned on the top surface;
    a plurality of coils, said coils disposed adjacent said flat top surface and being tuned to a near field communication frequency, and each of the plurality of coils being angled with respect to said flat top surface by contact with at least one of the plurality of bumps disposed on said flat top surface;
    an input/output terminal; and
    a switching device selectively coupling the coils to the input/output terminal,
    wherein:
    the coils are arranged radially on a periphery of the top surface; and
    each of the coils has an elevation angle between 5 and 20 degrees.

2. The apparatus of claim 1, wherein the coils comprise a plurality of square coils.

3. The apparatus of claim 2, wherein the coils comprise at least nine square coils.

4. The apparatus of claim 1, wherein a first one of the coils has a square shape and a second one of the coils has a rectangular shape.

5. The apparatus of claim 1, wherein the switching device comprises a relay switch equidistant from the coils.

6. The apparatus of claim 1 further comprising a controller coupled to the switching device and performing operations.

7. The apparatus of claim 6, wherein the operations comprise:
    causing the switching device to sequentially connect the coils to the input/output terminal for a time interval; and
    causing the switching device to interrupt the sequential connection and to initiate NFC communication via a selected one of the coils upon detection of a feedback signal, from the selected coil, above a threshold.

8. The apparatus of claim 6, further comprising:
    a filter coupled to switching device; and
    wherein the operations comprise:
        receiving a plurality of feedback signals, each of the feedback signals being associated with a respective one of the coils;
        reconfiguring circuitry to filter the feedback signals with the filter;
        identifying a trigger signal from the feedback signals, the trigger signal being greater than a threshold and being associated with a selected one of the coils; and
        causing the switching device to connect an NFC communication module with the selected coil via the input/output terminal.

9. The apparatus of claim 6, wherein the input/output terminal couples the controller with the switching device.

10. The apparatus of claim 8, wherein:
    the filter comprises a band-pass filter; and
    the operations further comprise:
        sending a request, via the NFC communication module using the selected coil, for communication with an NFC device;
        receiving a response from the NFC device through the selected coil; and
        sending a communication command to the NFC device using the selected coil.

11. The apparatus of claim 8, wherein receiving the feedback signals comprises:
    causing the switching device to couple the controller with different ones of the coils for a time interval; and
    estimating a signal-to-noise ratio of the feedback signals during the time interval.

12. The apparatus of claim 7, wherein the operations comprise:
- receiving a plurality of feedback signals, each of the feedback signals being associated with a respective one of the coils;
- determining whether at least one of the feedback signals is above the threshold;
- when at least one of the feedback signals is above the threshold, causing the switching device to couple an NFC communication module with the coils associated with feedback signals above the threshold via the input/output terminal; and
- when none of the feedback signals is above the threshold:
  - amplifying the feedback signals, each of the amplified signals being associated with at least one of the coils;
  - identifying a plurality of amplified signals above the threshold; and
  - causing the switching device to simultaneously couple the NFC communication module with the coils associated with the amplified signals above the threshold via the input/output terminal.

13. The apparatus of claim 8, wherein the controller is coupled to a proximity sensor; and
- the operations comprise transmitting instructions to a power management module to exit a power-saving mode when the proximity sensor detects presence of a target device.

14. The apparatus of claim 1, wherein the input/output terminal is disposed on a side surface of the base.

15. The apparatus of claim 1, wherein the coils comprise printed coils.

16. An automated teller machine system comprising:
- a user interface;
- a cash dispenser; and
- an NFC communication module,
- wherein the NFC communication module comprises:
  - a base comprising a flat top surface and a bottom surface, the base having a reference plane parallel to the bottom surface and a plurality of bumps patterned on the top surface;
  - a plurality of coils, said coils disposed adjacent said flat top surface and being tuned to a near field communication frequency, and each of the plurality of coils being angled with respect to said flat top surface by contact with at least one of the plurality of bumps disposed on said flat top surface;
  - an input/output terminal; and
  - a switching device selectively coupling the coils to the input/output terminal
- wherein:
  - each of the coils has an elevation angle between 5 and 20 degrees; and
  - the coils are symmetrically arranged with respect to a center of the top surface.

17. A method for communicating with an NFC device comprising:
- receiving a plurality of feedback signals, the feedback signals being associated with respective ones of a plurality of communication coils, the coils:
  - being mounted on a base comprising a flat top surface and a bottom surface, the base having a plurality of bumps patterned on the top surface;
  - disposed adjacent said flat top surface, and each of the plurality of coils being angled with respect to said flat top surface by contact with at least one of the plurality of bumps disposed on said flat top surface;
  - being tuned to a near field communication frequency; and
  - having elevation angles between 5 and 20 degrees;
- identifying a trigger signal from the feedback signals, the trigger signal being greater than a threshold and being associated with a selected one of the coils;
- causing a switching device coupled to the coils to connect an NFC communication module with the selected coil via an input/output terminal; and
- initiating NFC communications with the NFC device using the selected coil.

* * * * *